UNITED STATES PATENT OFFICE.

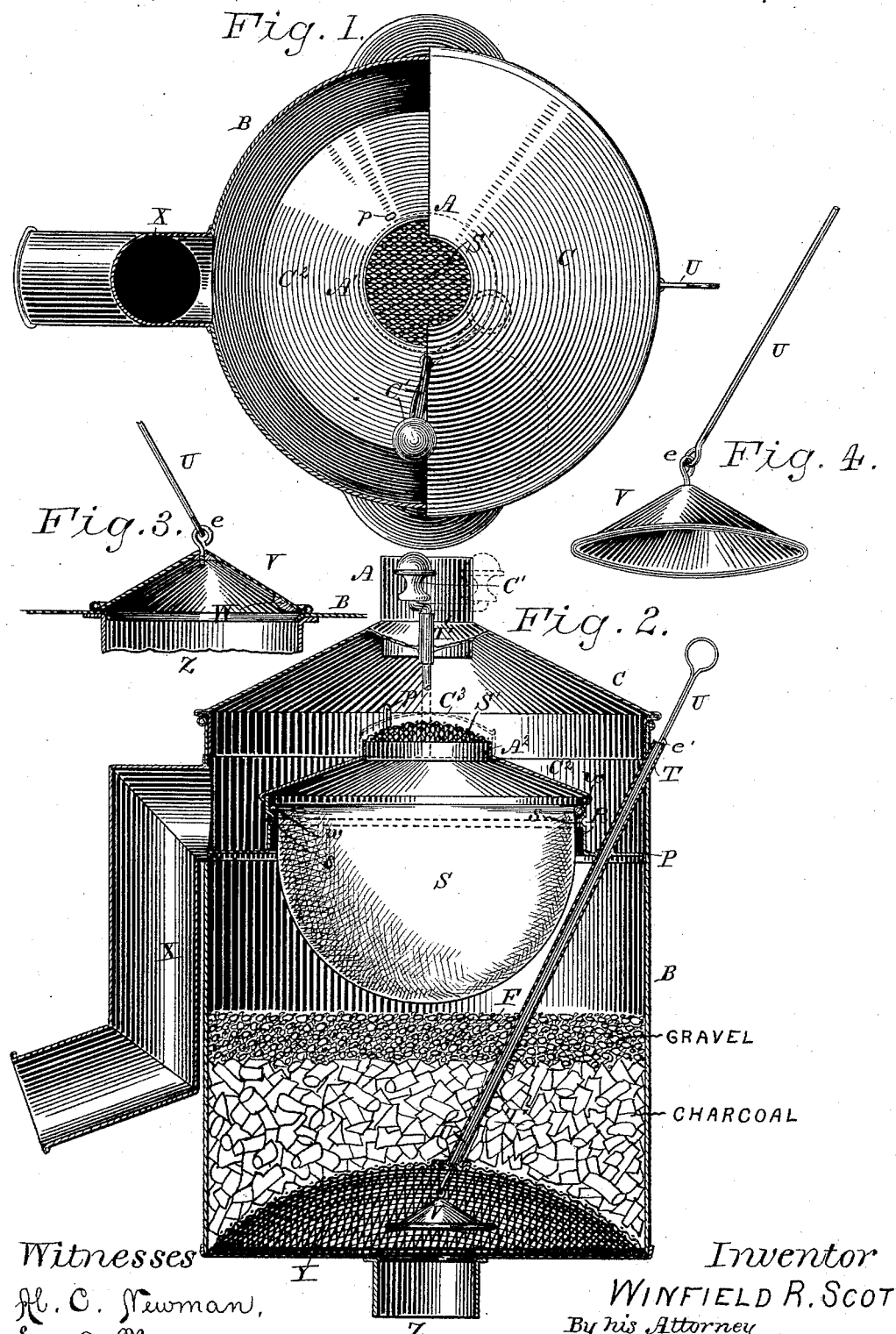

WINFIELD R. SCOTT, OF DANVILLE, KENTUCKY.

RAIN-WATER PURIFIER.

SPECIFICATION forming part of Letters Patent No. 412,862, dated October 15, 1889.

Application filed October 5, 1887. Serial No. 251,536. (No model.)

*To all whom it may concern:*

Be it known that I, WINFIELD R. SCOTT, a citizen of the United States, and a resident of Danville, in the State of Kentucky, have invented a new and useful Improvement in Rain-Water Purifiers, of which the following is a specification.

This invention relates to combined cut-offs and filterers for use in connection with rain-water leaders and cisterns for the purpose of excluding from the latter the more minute and even gaseous impurities, as well as the grosser foreign matters which contaminate rain-water as it flows from roofs.

The distinguishing objects of the present invention are, first, to arrest a considerable part of the soot and like impurities before they reach the filtering material; second, to protect the finer strainer and filtering material, either or both, against leaves and other grosser foreign matters by insuring the free escape of the latter at all times through the waste-outlet, and, third, to cut off or deflect all the water from the filter at will by a novel device fastened by gravity in its respective positions.

This invention consists in certain novel combinations of parts whereby the above-named objects are accomplished, as hereinafter set forth.

A sheet of drawings accompanies this specification as part thereof.

Figure 1 of the drawings is a top view of my rain-water purifier, half in section. Fig. 2 represents a vertical section of the same, with the valve in elevation. Fig. 3 represents a sectional view of the valve and its seat on a large scale, and Fig. 4 is a perspective view of the valve.

Like letters of reference indicate corresponding parts in the several figures.

A central inlet-neck A leads into an upright cylindrical body B, which has a removable cover C, that supports said inlet-neck and the cut-off C'. The body and like main parts are designed to be made of galvanized sheet metal, with the body of sufficient capacity for the passage through the filter of the maximum discharge of a rain-water leader of given size and for an ample quantity of filtering material F, which is preferably gravel and charcoal, the former on top, as indicated in Fig. 2. The filtering material is supported upon a convex screen Y, Fig. 2, beneath which the pure water escapes through a central depending neck Z.

To protect the filtering material against contamination so far as possible, a textile strainer S, in the form of a circular bag, is removably supported immediately above the same in central position. It is so supported by a fixed curb-ring R, having an inwardly-projecting stop-bead $s$, which coacts with a wire $w$, with which the upper edge of the strainer is provided, as clearly shown in Fig. 2. Said curb-ring is supported by an annular horizontal or nearly horizontal partition P, and this partition, in connection with said curb-ring R and the walls of the body B, within which it is fixed, forms an efficient wasteway leading to the waste-outlet X. To insure the discharge of leaves, bugs, and like "trash" into said wasteway, a conical inner cover $C^2$ is fitted to said curb-ring R, this inner cover having a central inlet-neck $A^2$, which is of somewhat larger diameter than the inlet-neck A, and is provided with a convex primary screen S', of suitable wire-cloth, to deflect such grosser foreign matters. The cut-off C' comprises an imperforate flanged cover or cap $C^3$, loosely fitted to said inner neck $A^2$, and having a convex top, so as to fit over the screen S' in one of its positions, as shown in dotted lines in Figs. 1 and 2. In this position of the cut-off all the water is deflected into the circumjacent wasteway and escapes through the waste-outlet X. The other moving part of the cut-off C' is a vertical crank-handle rigidly attached to said cap $C^3$ at one edge thereof, and adapted to slide vertically, as well as to swing freely, in a fixed tube T', with which the main cover C is provided at a suitable point.

When the purifier is working, the cap $C^3$ hangs to one side of the neck $A^2$, so as to fully expose said primary screen S', as indicated in full lines. To divert the water, the cap $C^3$ is lifted by means of the crank-handle of the cut-off C', and is swung over the screen S', where it strikes a stop-post $p$ upon the inner cover $C^2$. The cap gravitates to said dotted-line position when the handle is released, so as to be self-fastened, and is fastened in its other position in like manner.

To cleanse the filtering material occasionally without disturbing it by floating out soot and the like, I employ a "loose valve" V, in the form of a cone, attached at its apex—by a pair of eyes e, for example—to the lower end of a valve-rod U, of stiff wire, beneath said screen Y and seated upon the flat bottom of the body B, above the outlet-neck Z, so as to close the outlet to a sufficient extent when the valve is lowered, as shown in Fig. 3. An obliquely-arranged fixed tube T incloses the rod U above the screen Y to a point outside the body B near its top, where the tube coacts with the rebent upper end e' of the rod as a stop to support the valve V in elevated position, as shown in Fig. 2. In this position the valve is agitated by the flow of water around it, so as to keep it from rusting fast, and thus to insure its effective operation when it is lowered. At the same time the closure is such that any water remaining in the purifier after the rain stops is permitted to escape beneath the valve. The valve may be conveniently made of sheet metal with a wired edge, as represented, and may be weighted inside by solder, as represented at W in Fig. 3, so as to balance it in its elevated position.

I have set forth in detail the construction which I now consider best, but do not limit my claims to mechanical details, except as stated in the respective claims.

Having thus described my said improvement in rain-water purifiers, I claim as my invention and desire to patent under this specification—

1. The combination, in a rain-water purifier, of a main cover provided with a vertical inlet-neck, a body having within its upper end a fixed annular curb located below said neck and concentric therewith and provided with an inwardly-projecting stop-bead, a removable textile strainer having a distending wire which coacts with said stop-bead, and a filter, as of gravel and charcoal, beneath said strainer, whereby said filter is protected against contamination by soot and like impurities, substantially as hereinbefore specified.

2. The combination, in a rain-water purifier, of a main cover provided with a vertical inlet-neck, a conical inner cover having an inner inlet-neck in line with the one first named provided with a convex primary screen of wire-cloth, a wasteway surrounding said inner cover, and a waste-outlet leading from said wasteway, substantially as herein specified.

3. The combination, in a rain-water purifier, of a main cover provided with a vertical inlet-neck, an inner cover having an inner inlet-neck in line with the one first named, a waste-outlet communicating with the space above said inner cover, and a gravitating cut-off comprising a laterally-swinging cap loosely fitted to said inner neck, and a vertically-sliding crank-handle rigidly attached thereto at one edge and supported by said main cover, substantially as herein specified.

WINFIELD R. SCOTT.

Witnesses:
DANIEL T. FACKLER,
F. M. SHUMATE.